United States Patent
Gallagher et al.

[11] Patent Number: 5,933,784
[45] Date of Patent: Aug. 3, 1999

[54] SIGNALING GATEWAY SYSTEM AND METHOD

[75] Inventors: Michael D. Gallagher, San Jose; Ming J. Lee, Los Altos; Vilnis G. Grencions, Santa Clara, all of Calif.

[73] Assignee: Synacom Technology, Inc., San Jose, Calif.

[21] Appl. No.: 08/672,662

[22] Filed: Jun. 28, 1996

[51] Int. Cl.$^6$ ........................................ H04Q 7/20
[52] U.S. Cl. .............. 455/552; 455/432; 455/433; 370/401; 370/466
[58] Field of Search .................. 455/410, 411, 455/422, 426, 432, 433, 435, 436, 462, 465, 552, 553; 380/23; 370/338, 401, 465, 466, 522, 524

[56] References Cited

U.S. PATENT DOCUMENTS

| | | | |
|---|---|---|---|
| 5,241,598 | 8/1993 | Raith | 455/433 |
| 5,313,465 | 5/1994 | Perlman et al. | 370/466 |
| 5,353,331 | 10/1994 | Emery et al. | 379/58 |
| 5,406,616 | 4/1995 | Bjorndahl | 379/59 |
| 5,561,840 | 10/1996 | Alvesalo et al. | 455/33.1 |
| 5,610,974 | 3/1997 | Lantto | 379/59 |
| 5,655,003 | 8/1997 | Erving et al. | 455/435 |
| 5,659,598 | 8/1997 | Byrne et al. | 455/426 |
| 5,852,660 | 12/1998 | Lindquist et al. | 370/401 |

*Primary Examiner*—Dwayne D. Bost
*Assistant Examiner*—Nay A. Maung
*Attorney, Agent, or Firm*—Fenwick & West LLP

[57] ABSTRACT

A system and method for enabling two or more communication systems, each supporting a different and possible incompatible signaling protocol, to communicate with each other where the system and method are not located within any of the affected systems and for enabling a mobile station to utilize features supported by the visited system even if its home system does not support the feature. The system of the present invention is a signaling gateway that is coupled to a communications signaling network. or the signaling gateway can be coupled directly to the incompatible systems. Communication signals that are transmitted from a first communication system to a second communication system and transmitted from the second network to the first network are received and transmitted by the signaling gateway. The protocols used by the first and second communication systems are not fully compatible in that some (or all) of the signaling commands used by the first communication system do not translate directly into signaling commands understood by the second communication system.

22 Claims, 10 Drawing Sheets

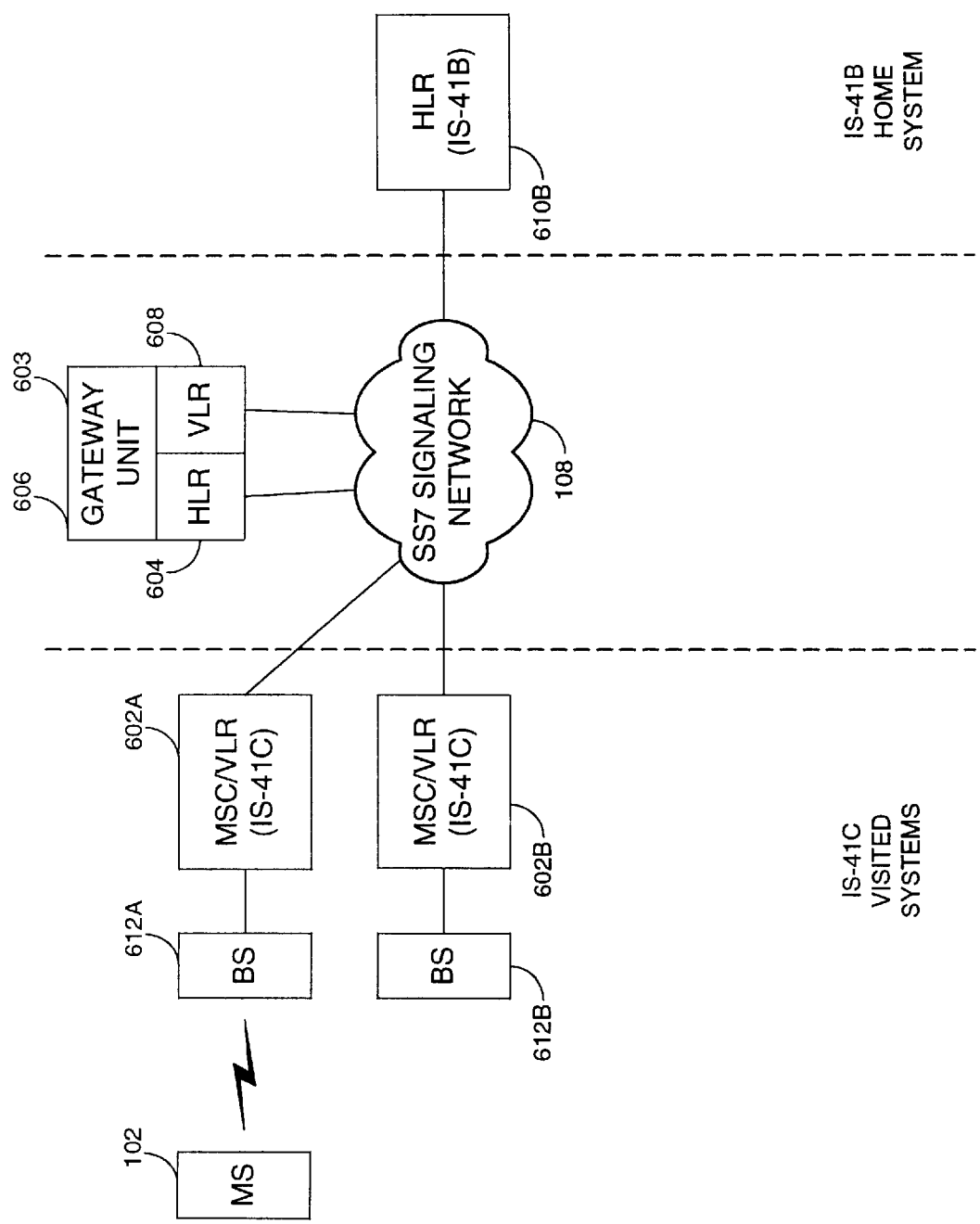

SIGNALING GATEWAY SYSTEM AND METHOD

A portion of the disclosure of this patent document contains material which is subject to copyright protection. The copyright owner has no objection, subject to the restrictions of 37 C.F.R. § 1.14, to the facsimile reproduction by anyone of the patent document or patent disclosure, as it appears in the Patent and Trademark Office patent file or records but otherwise reserves all copyright rights whatsoever.

BACKGROUND OF THE INVENTION

1. Field of the Invention

The present invention relates generally to the field of communication systems and more particularly to the field of cellular telephone communication between communication systems having different signaling protocols.

2. Description of Background Art

In recent years the use of cellular telephones and cellular communications systems has significantly increased. Many of the early communication systems were based upon analog technology, e.g., the advanced mobile phone system (AMPS). In recent years the protocols used by some of these analog systems have been modified to add features, e.g., call forwarding and authentication, and some digital systems have been developed that use digital signaling protocols, e.g., the digital communication system (DCS1900). FIG. 1 is an illustration of a conventional cellular communication network. The communication network includes a mobile station (MS) 102, e.g., a dual-mode AMPS/DCS1900 cellular telephone that can operate using an AMPS protocol and the DCS1900 protocol which will be manufactured and commercially available from Motorola Corporation. The MS 102 transmits and receives an electromagnetic signal to a base station (BS) 104 via the air. In FIG. 1, four BSs 104 are illustrated. Two BS 104A–B are part of a first system, e.g., an IS-41B/AMPS system, and two BSs 104C–D are part of a second system, e.g., a DCS1900 system. Typically, a BS 104 is a tower having an antenna and a transceiver. The MS 102 communicates with a BS 104 whose physical location is near the MS 102. Currently, there are thousands of BSs 104 in the United States. Some of the functions performed by each BS 104B include converting the received electromagnetic signal into an electrical signal, assigning a voice channel to the MS 102, and paging an MS 102. The BS 104 transmits a signal representing a unique MS identifier to a mobile switching center (MSC) using a signaling protocol supported by the MSC. The IS-41B signaling protocol is described in greater detail in the Telecommunications Industry Association/Electronic Industries Association (TIA/EIA), Interim Standard IS-41-B, Electronic Industries Association, December 1991 that is incorporated by reference herein in its entirety. The IS-41C signaling protocol is described in greater detail in the TIA/EIA, Interim Standard IS-41-C, Cellular Radio-Telecommunications Intersystem operations, February 1996 that is incorporated by reference herein in its entirety. Frequently, the MSC includes a visitor location register (VLR) and together are illustrated in FIG. 1 as an MSC/VLR 106. Currently, there are hundreds of MSC/VLRs 106 in the United States. Frequently, in the AMPS system, each MSC/VLR 106A–B and its associated BSs 104A–B are provided by a single manufacturer, e.g., Motorola Corp. Accordingly, a proprietary interface protocol is typically used to communicate between the BSs 104A–B and the MSC 106A–B. For DCS1900 systems, the DCS1900 standard protocol is used to communicate between the BSs 104C–D and the MSC 106C. The DCS1900 protocol is described in greater detail in TIA/EIA Interim Stantdard IS-652, February 1996 which is incorporated by reference herein in its entirety.

The MSC/VLR 106A identifies the home system, e.g., system 2, of the MS 102 and transmits a signal through a signaling network 108, e.g., the signaling system 7 (SS7) which is a standard telecommunication signaling system, to the home system for the purpose of registering the MS 102. The home system includes an MSC/VLR 106C and a home location register (HLR) 110B having a profile of the subscriber (registered user) of the MS 102. A subscriber profile includes a copy of the unique MS identifier and indications of the type of services available to the subscriber, e.g., call forwarding and multi-party calling. One purpose of registering the MS 102 with the home system is to enable the MSC/VLR 106A to charge the home system so that the home system can charge the owner of the MS 104 for the cost of the call on the cellular network. If the unique MS identifier matches a stored identifier in the home system, then the home system transmits a registration signal to the MSC/VLR 106A and the user of the MS 102 is then permitted to use the cellular network.

One problem with conventional systems is that if the protocol utilized by the first system to which the MS 102 is transmitting is incompatible with the protocol utilized by the second system which is the home system of the MS 102, then registration signals transmitted by the MSC/VLR 106A in the first system will not be properly interpreted by the HLR 110 of the second system. A conventional solution to this problem is to have a dual-mode HLR in the home system that is capable of interpreting the protocols utilized in both the first system and the second system. In the present example, the dual-mode HLR would be capable of transmitting and receiving signals using the IS-41B protocol and the DCS1900 protocol. A problem with this solution is that developing and manufacturing a dual-mode HLR is expensive and is only capable of interpreting signals received by the HLR itself. That is, each HLR must have this dual-mode capability.

Another problem with conventional systems occurs when the first system illustrated in FIG. 1 supports a protocol, e.g., IS-41C, that is compatible with the protocol supported by the second system, e.g., IS-41B, but the first system offers more features to the user, e.g., authentication. In conventional systems, the MS 102 can not take advantage of the additional features offered by the first system when traveling through the area supported the first system. For example, a significant problem with current cellular networks is fraud. Specifically, the signal between the MS 102 and the BS 104A can be intercepted by an unauthorized source. The unauthorized source can determine the unique MS identifier included in the intercepted signal and can then program a fraudulent MS to transmit the intercepted MS identifier. As a result, the unauthorized source utilizes the cellular network and the cost of this use is charged to the subscriber whose MS identifier was intercepted. Some estimates of the monetary losses from this type of fraud range from $2 million to $3 million per day, as of 1996. Fraud typically occurs more frequently in larger cities. Accordingly, many system providers in the larger cities have upgraded the signaling protocol in order to include an authentication feature. For example, the IS-41C signaling protocol supports authentication while the IS-41A and IS-41B signaling protocols do not support authentication. Conventional systems do not permit a dual-mode MS 102 to utilize the authentication capabilities (or other additional features) of the IS-41C signaling protocol while traveling through an area supported by the first system if the home system does not support authentication (or other additional features), e.g., if the home system only supports the IS-41B signaling protocol.

The authentication standards developed by the TIA, for example the TSB51, are described in TIA/EIA, Telecommunications System Bulletin—TSB51, Cellular Radiotelecommunications: Authentication, Signaling Message Encryption and Voice Privacy, May 1993, that is incorporated by reference herein in its entirety, and the TIA IS-41-C. The TIA air interface standards are: IS-54-B that is described in TIA/EIA, Interim Standard IS-54-B, Cellular System Dual-Mode Mobile Station—Base Station Compatibility Standard, April 1992; IS-88, described in TIA/EIA, Interim Standard IS-88, Mobile Station—Land Station Compatibility Standard for Dual-Mode Narrowband Analog Cellular Technology, January, 1993; IS-91, described in TIA/EIA Interim Standard IS-91, Mobile Station—Base Station Compatibility Standard for 800 MHz Analog Cellular, October, 1994; IS-95-A, described in TIA/EIA, Interim Standard IS-95-A, Mobile Station—Base Station Compatibility Standard for Dual-Mode Wideband Spread Spectrum Cellular Systems, May, 1995; and IS-136, described in TIA/EIA, Interim Standard IS-136, 800 MHz TDMA Cellular—Radio Interface—Mobile Station—Base Station Compatibility, December, 1994, that are all incorporated by reference herein in their entirety. In addition, a more detailed description of the SS7 network is described in the American National Standards Institute, Inc. (ANSI), American National Standard for Telecommunications, Signaling System Number 7 (SS7)—General Information; Exchange Carriers Standards Association Committee T1; T1.111-1992 which is incorporated by reference herein in its entirety.

What is needed is a system and method for (1) enabling two or more communication systems each supporting a different and possible incompatible signaling protocol to communicate with each other where the system and method are not located within any of the affected systems; and (2) enabling a mobile station to utilize features supported by the visited system even if its home system does not support the feature.

SUMMARY OF THE INVENTION

The invention is a system and method for enabling two or more communication systems, each supporting a different and possible incompatible signaling protocol, to communicate with each other where the system and method are not located within any of the affected systems and for enabling a mobile station to utilize features supported by the visited system even if its home system does not support the feature. The system of the present invention is a signaling gateway that is coupled to a communications signaling network. Alternatively, the signaling gateway can be coupled directly to the incompatible systems. Communication signals that are transmitted from a first communication system to a second communication system and transmitted from the second network to the first network are received and transmitted by the signaling gateway. The protocols used by the first and second communication system are not fully compatible in that some (or all) of the signaling commands used by the first communication system do not translate directly into signaling commands understood by the second communication system.

The location of the present invention provides several advantages over previous systems. For example, the present invention can operate with many different systems in the first and second communication system. In addition, the signaling gateway is a visitor location register (VLR) from the perspective of the systems in the second communication system because the signaling gateway performs the functions of a VLR of the first communication system. Similarly, the signaling gateway is a home location register (HLR) from the perspective of the systems in the first communication system because the signaling gateway performs the functions of a HLR in the second system, when the second communication system includes the home system.

The signaling gateway interprets command signals received by the first communication system, for example, and can (1) generate a response signal and transmit the response signal back to the first communication system, (2) generate a command signal based upon the protocol of the second communication system and transmit the command signal to the second communication system, and/or (3) generate both a response signal and command signal as appropriate. Another feature of the present invention is that the present invention enables mobile stations (MSs) that are operating in a first communication system to utilize features that are supported by the first communication system even if the home system of the MS does not support the feature, e.g., an authentication feature.

BRIEF DESCRIPTION OF THE DRAWINGS

FIG. 6 is an illustration of an example of a cellular network including a signaling gateway according to the preferred embodiment of the present invention, where features supported by a visited system are not supported by a home system.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

Figure 2:
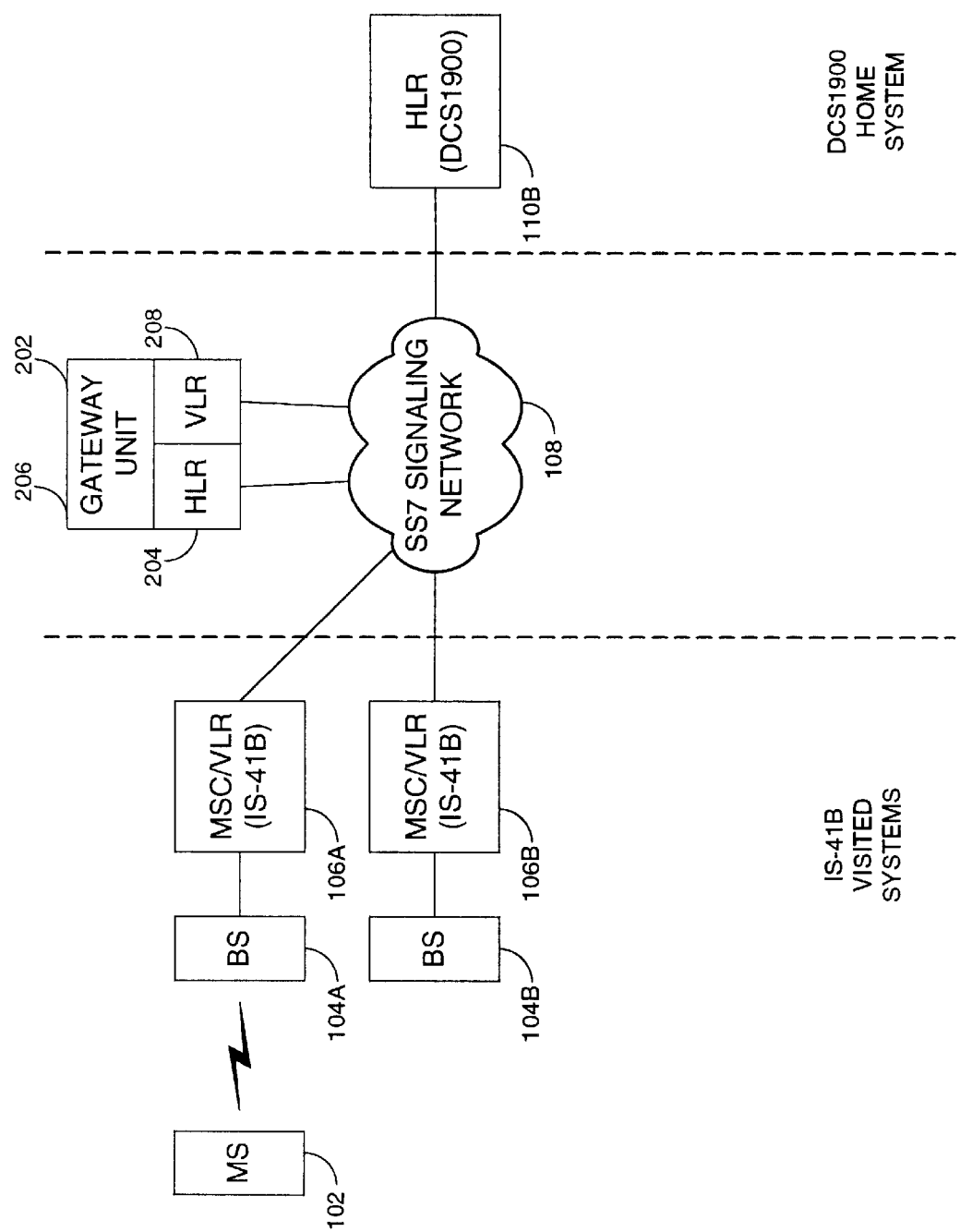
FIG. 2 is an illustration of an example of a cellular network including a signaling gateway according to the preferred embodiment of the present invention.

FIG. 2 is an illustration of an example of a cellular network including a signaling gateway according to the preferred embodiment of the present invention. The cellular network includes an IS-41 visited system having two base stations (BSs) 104A–B, and two mobile switching centers/visitor location registers (MSC/VLR) 106A–B. Each MSC/VLR 106 is connected to a SS7 signaling network 108, described above. The SS7 108 is disposed between the visited system and a home system. The home system is the system that includes the home location register (HLR) 110B for a particular mobile station (MS) 102. Since the MS 102 can be physically located outside an area supported by the home system, i.e., outside the range of any BS 104C–D of the home system, BSs 104A–B of other systems can receive the electromagnetic signals transmitted from the MS 102. The system in which these BSs 104A–B are located is called the visited system. As described above, in order to provide a proper accounting of the costs involved in the cellular communication session, the MSC/VLR 106 of the visited system communicates with the HLR 110B of the home system. However, the protocol utilized by the visited system, e.g., the IS-41 protocol, and the protocol utilized by the home system, e.g., the DCS1900 protocol, may not be compatible. In the present invention a signaling gateway 202 is coupled to the SS7 signaling network 108. The signaling gateway receives signals transmitted by the home system's HLR 110B and signals transmitted by the MSC/VLR 106A–B of the visited system. A benefit of this configuration is that the signaling gateway is located outside of both the visited system and the home system and, therefore, can be utilized by many systems as opposed to only the system in which it is located. In an alternate embodiment the signaling gateway 202 is coupled directly to any or all of the communication systems. The signaling gateway 202 includes a gateway HLR unit 204, a gateway unit 206, and a gateway VLR unit 208. The operation of the signaling gateway is described in greater detail below with reference to FIGS. 3–8.

Figure 3:
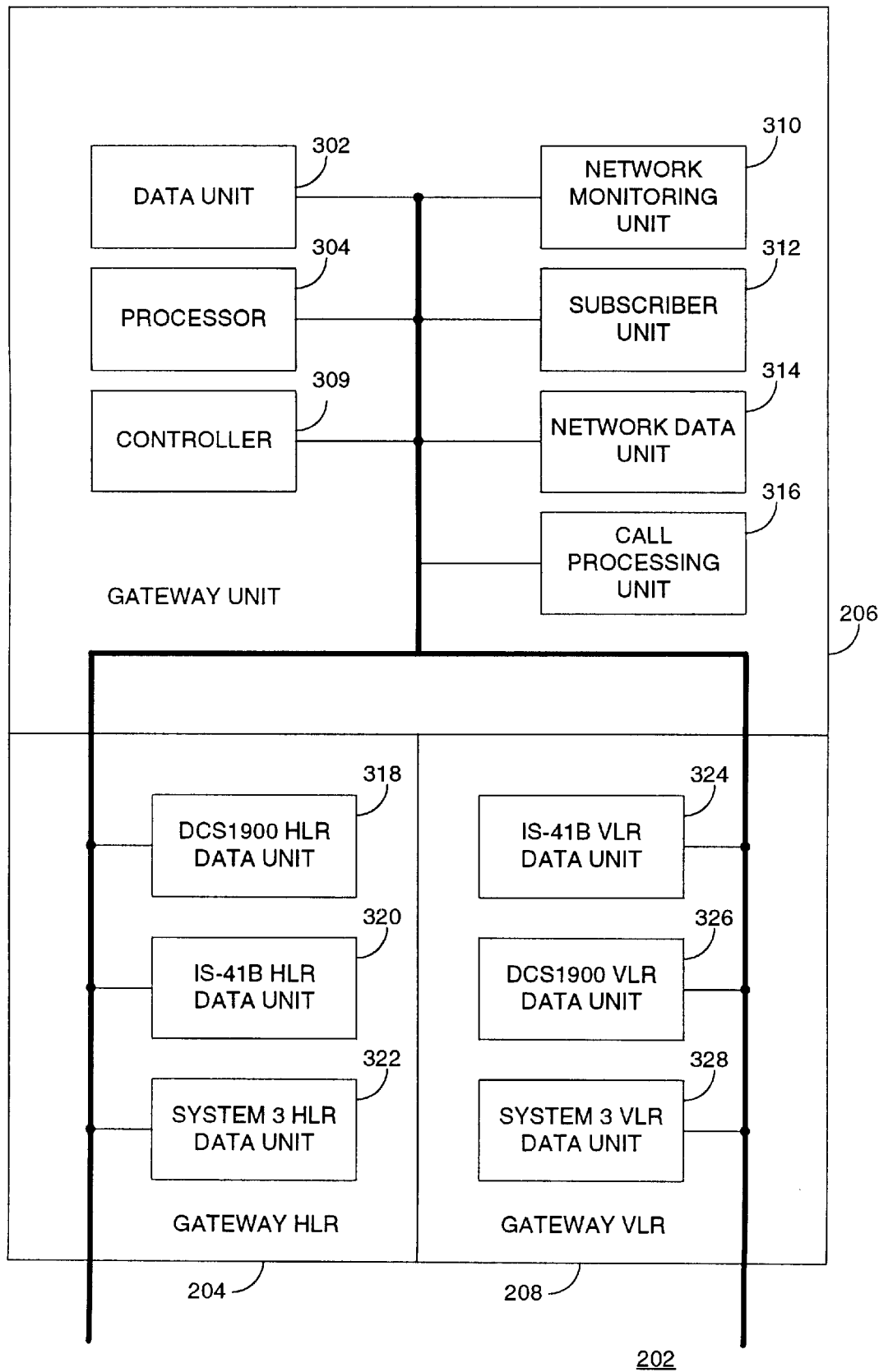
FIG. 3 is a more detailed illustration of the signaling gateway of the present invention.

FIG. 3 is a more detailed illustration of the signaling gateway 202 of the present invention. The gateway unit 206 includes a data unit 302, a processor 304, a controller 309, a network monitoring unit 310, a subscriber unit 312, a network data unit 314, and a call processing unit 316. The gateway HLR unit 204 can include one or more of a DCS1900 HLR data unit 318, an IS-41B HLR data unit 320, and a System 3 HLR data unit 322, for example an IS-41C HLR data unit. In the example illustrated in FIG. 2, the gateway HLR unit 204 is a HLR from the perspective of the visited system MSC/VLR 106A. It is a HLR in that the gateway HLR unit 204 performs the functions of a HLR from the perspective of the visited system MSC/VLR 106A. For example, the visited system MSC/VLR 106A transmits signals to the gateway HLR unit 204 and receives signal from the gateway HLR unit 204 as if the gateway HLR unit were the HLR in the home system. The gateway VLR unit 208 can include one or more of an IS-41B VLR data unit 324, a DCS1900 VLR data unit 326, and a system 3 VLR data unit 328, for example, an IS-41C VLR data unit 328. In the example illustrated in FIG. 2, the gateway VLR unit 208 is a VLR from the perspective of the home system HLR 110B. It is a VLR in that the gateway VLR unit 208 performs the functions of a VLR from the perspective of the home system HLR 110B. For example, the home system HLR 110B transmits signals to the gateway VLR unit 208 and receives signal from the gateway VLR unit 208 as if the gateway VLR unit were the VLR in the MSC/VLR 106A of the visited system.

In the preferred embodiment, the data unit 302, the controller 309, the network monitoring unit 310, the subscriber unit 312, the network data unit 314, and the call processing unit 316 are located in a storage device, e.g., a conventional random access memory (RAM) module. The data unit 302 receives and stores signals from the gateway HLR unit 204 and the gateway VLR unit 208. The network monitoring unit 310 monitors the signals transmitted through the signaling gateway 202 and generates performance statistics, e.g., the number of messages. The controller 309 controls the operation of the signaling gateway 202 including identifying and controlling data bus access and communicating with the elements in the gateway unit 206 the gateway HLR unit 204, and the gateway VLR unit 208 to control the timing and sequence of the procedures performed by signaling gateway 202. The functions performed by the controller 309 are described below with reference to FIGS. 4–8.

The subscriber unit 312 performs an interfacing function between the protocol of the visited system and the protocol of the home system. A more detailed description of the functions performed by the subscriber unit is set forth below with reference to FIGS. 4–8. The network data unit 314 stores network information, for example the address of the signaling gateway 202, the address of the gateway HLR unit 204 and the address of the gateway VLR unit 208. The call processing unit 316 performs the routing functions for the signaling gateway, for example the call processing unit 316 converts call routing requests from the home system into call routing requests of the visited system and the conversion of response signals from the visited system to the home system.

The gateway HLR unit 204 can include multiple HLR data units in order to provide HLR services to a visited system supporting one of a variety of signaling protocols. For example, the DCS1900 HLR data unit 318 performs HLR functions for a visited system that supports the DCS1900 signaling protocol. The IS-41B HLR data unit 320 performs HLR functions for a visited system that supports the IS-41B signaling protocol. The system 3 HLR data unit 322 performs HLR functions for a visited system that supports a different signaling protocol, e.g., the IS-41C signaling protocol. Similarly, the gateway VLR unit 208 can include multiple VLR data units in order to provide VLR services to home systems supporting one of a variety of signaling protocols. For example, the DCS1900 VLR data unit 326 performs VLR functions for a visited system that supports the DCS1900 signaling protocol. The IS-41B VLR data unit 324 performs VLR functions for a visited system that supports the IS-41B signaling protocol. The system 3 VLR data unit 328 performs VLR functions for a visited system that supports a different signaling protocol, e.g., the IS-41C signaling protocol. The operation of the gateway HLR unit 204 and the gateway VLR unit 208 are described in greater detail below with reference to FIGS. 4–8. In alternate embodiments the signaling gateway 202 performs similar functions however the unit that performs each function differs. That is, the functions performed by the gateway HLR unit 204, the gateway unit 206, and the gateway VLR unit 208 may be modified without departing from the spirit and scope of the present invention.

Figure 4A:
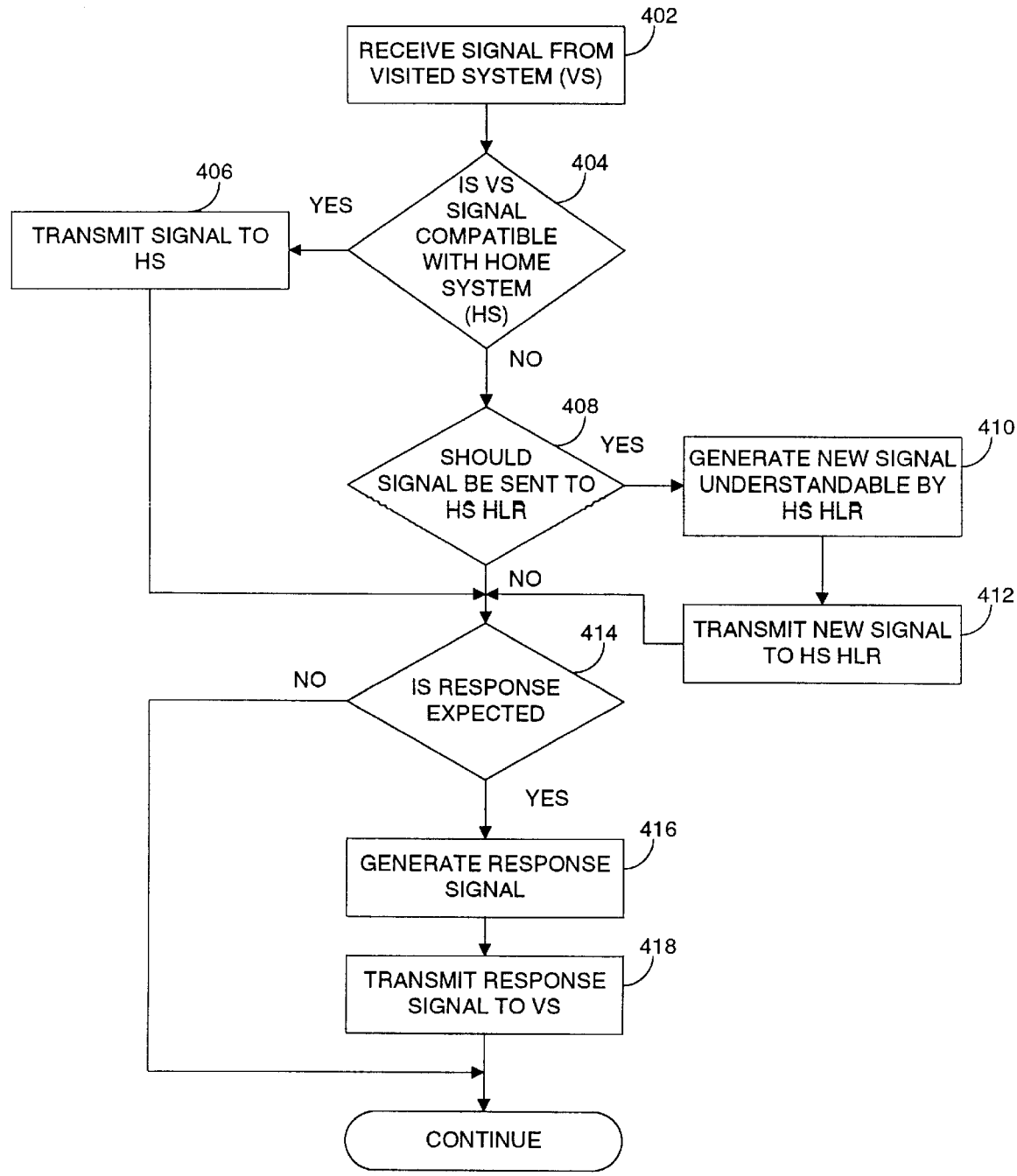
FIG. 4a is flowchart illustrating the process of the signaling gateway when receiving a signal from a visited system according to the preferred embodiment of the present invention.

FIG. 4a is a flowchart illustrating the process of the signaling gateway when receiving a signal from a visited system according to the preferred embodiment of the present invention. FIG. 4a will be described with reference to the communication system illustrated in FIG. 2 and the signaling gateway 202 described in FIG. 3. As described above, the dual-mode MS 102 is capable of communicating in systems supporting either the AMPS and IS-41B signaling protocol or the DCS1900 signaling protocols. In general, the AMPS protocol specifies the signaling interface utilized in the MS-BS communication link while the IS-41 specifies the signaling interface in the MSC/HLR and VLR/HLR communication links. In contrast, the DCS1900 protocol specifies the signaling interface between all of these communication links. In this example the home system of the MS 102 includes the DCS1900 HLR 110B. The MS 102 is out of range of the home system and is in range of the IS-41B BS 104A that supports the AMPS protocol. However, since the MS 102 is a dual-mode MS 102 it can communicate with the BS 104A. However, since the IS-41B protocol and the DCS1900 protocol are not compatible, communication between systems utilizing these different protocols has been difficult to achieve. As indicated above, the signaling gateway 202 of the present invention solves this problem. The IS-41B HLR data unit 320 in the gateway HLR unit 204 receives 402 a signal from the MSC/VLR 106A of the visited system (IS-41B system). The IS-41B HLR data unit 320 performs the functions of a conventional HLR. For example, the IS-41B HLR data unit 320 manages the communication with the MSC/VLR 106, and considers the gateway unit as a logical database and a source of various service requests, e.g., for OA&M and call routing. The IS-41B HLR data unit 320 requests information from the data unit 302 in the gateway unit 204. Thereafter, the controller 309 gives program control to the subscriber unit 312 which determines 404 if the gateway unit 206 has the requested information and if the signal received from the visited system is compatible with the home system and is the MS 102 a subscriber to the gateway service. If so, the subscriber unit sends an appropriate signal to the DCS1900 VLR data unit 326. The DCS1900 VLR data unit 326 then transmits 406 the signal to the home system HLR 110B and the process continues with step 414, which is described below.

If the signal is not compatible with the home system, the subscriber unit 312 determines 408 if a signal is to be transmitted to the home system. This determination is based upon the type of signal received from the visiting system. Some considerations in making this determination include whether information from the home system HLR 110B is necessary to respond to the signal received from the visited system, and whether the received signal includes information that should be sent to the home system. If the subscriber unit 312 determines 408 that a signal should be sent to the home system HLR 110B, the subscriber sends an appropriate signal to the gateway VLR unit 208. An appropriate signal is a signal that causes the gateway VLR unit 208 to generate a DCS1900 signal that will, for example, request the desired information. The gateway VLR unit 208 generates 410 this signal and transmits 412 the new signal to the home system HLR 110B.

If the subscriber unit 312 determines that the visited system is expecting a response signal based upon the protocol utilized by the visited system, e.g., the IS-41B protocol, the subscriber unit 312 sends an appropriate signal to the gateway VLR unit 208 which generates 416 a response signal and transmits 418 the response signal to MS 102 via the MSC/VLR 106A and the BS 104A of the visited system.

Figure 4B:
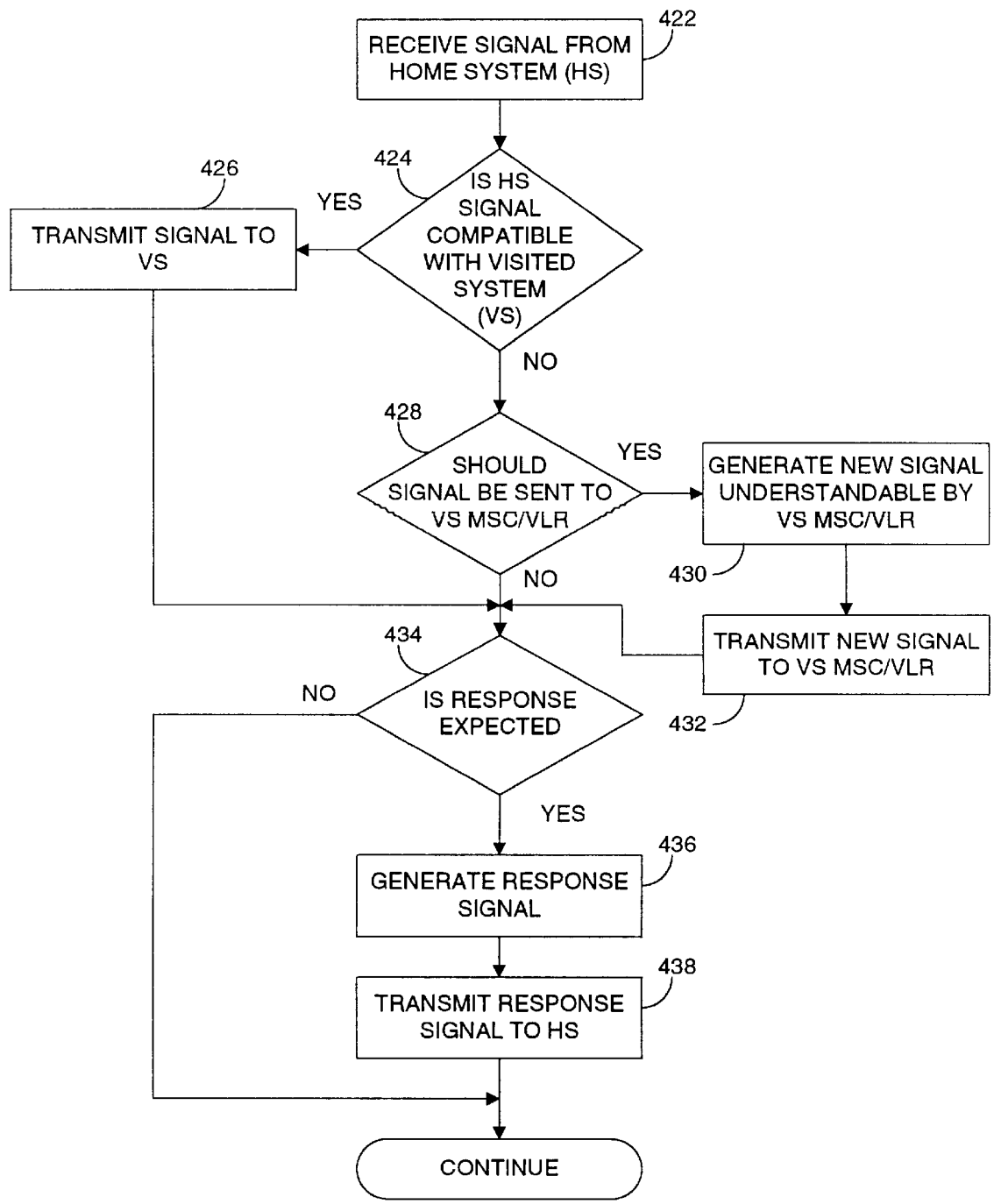
FIG. 4b is flowchart illustrating the process of the signaling gateway when receiving a signal from a home system according to the preferred embodiment of the present invention.

FIG. 4b is a flowchart illustrating the process of the signaling gateway when receiving a signal from a home system according to the preferred embodiment of the present invention. FIG. 4b will be described with reference to the communication system illustrated in FIG. 2 and the signaling gateway 202 described in FIG. 3. As described above, the dual-mode MS 102 is capable of communicating in systems supporting either the AMPS and IS-41B signaling protocols or the DCS1900 signaling protocols, for example. In this example the home system of the MS 102 includes the DCS1900 HLR 110B. The MS 102 is out of range of the home system and is in range of the IS-41B BS 104A that supports the AMPS protocol. Since the MS 102 is a dual-mode MS it can communicate with the BS 104A. However, since the IS-41B protocol and the DCS1900 protocol are not compatible, communication between systems utilizing these different protocols has been difficult to achieve. As indicated above, the signaling gateway 202 of the present invention solves this problem. FIG. 4a illustrates the situation when the visited system transmits a signal to the signaling gateway. FIG. 4b illustrates a signal transmission in the opposite direction. That is, the HLR 110B of the home system transmits a signal to the signaling gateway 202. The DCS1900 VLR data unit 326 in the gateway VLR unit 208 receives 422 a signal from the HLR 110B of the home system (DCS1900 system). The DCS1900 VLR data unit 326 transmits the signal to the data unit 302 in the gateway unit 204. The DCS1900 VLR data unit 320 performs the functions of conventional VLRs. For example, the DCS1900 VLR data unit 326 manages the communication with the home system HLR 110B, it also considers the gateway unit as a logical database, a logical MSC, and a source of various service requests, e.g., for OA&M and feature requests. The controller 309 gives program control to the subscriber unit 312 which determines 424 if the signal received from the home system is compatible with the visited system. If the received signal is compatible with the visited system the subscriber unit sends an appropriate signal to the IS-41B HLR data unit 320. The IS-41B HLR data unit 320 then transmits 426 the signal to the visited system and the process continues with step 434, described below.

If the signal is not compatible with the visited system, the subscriber unit 312 determines 428 if a signal is to be transmitted to the visited system. This determination is based upon the type of signal received from the home system, and whether the received signal includes information that should be sent to the home system. If the subscriber unit 312 determines 428 that a signal should be sent to the MSC/VLR 106A of the visited system, the subscriber unit 312 determines the appropriate type of IS-41B signal to generate, and sends an appropriate signal to the IS-41B HLR data unit 320 which generates 430 this signal and transmits 432 the signal to the MSC/VLR 106A of the visited system.

If the subscriber unit 312 determines 434 that the HLR 110B of the home system is expecting a response signal based upon the protocol utilized by the home system, e.g., the DCS1900 protocol, the subscriber unit 312 sends an appropriate signal to the DCS1900 VLR data unit 326. The DCS1900 VLR data unit then transmits 438 the response signal to HLR 110B of the home system via the DCS1900 VLR data unit 326. It will be apparent that the present invention operates between systems using different protocols in addition to the IS-41B protocol and the DCS1900 protocol. The conversion requirements between two protocols will be apparent to persons skilled in the relevant art.

The above description of FIG. 4a and FIG. 4b describe the functions performed by the subscriber unit 312 when receiving a signal having subscriber information therein, e.g., subscriber validation information (e.g., identifying a period between required authorizations), calling features (e.g., call forwarding) that are currently authorized and active, and the identification of the current serving systems. In addition, the call processing unit 316 performs similar operation as the subscriber unit 312 when a routing signal is received by the signaling gateway 202. One specific routing operation can be the identification of a temporary directory number assigned to the visiting subscriber for call delivery purposes.

A detailed description of the processes illustrated in FIG. 4a and FIG. 4b and a more detailed description of one embodiment of the present invention where the signaling gateway 202 is coupled between an IS-41 based system and a DCS1900 based system, is set forth in Appendix A of this application.

Figure 5A:
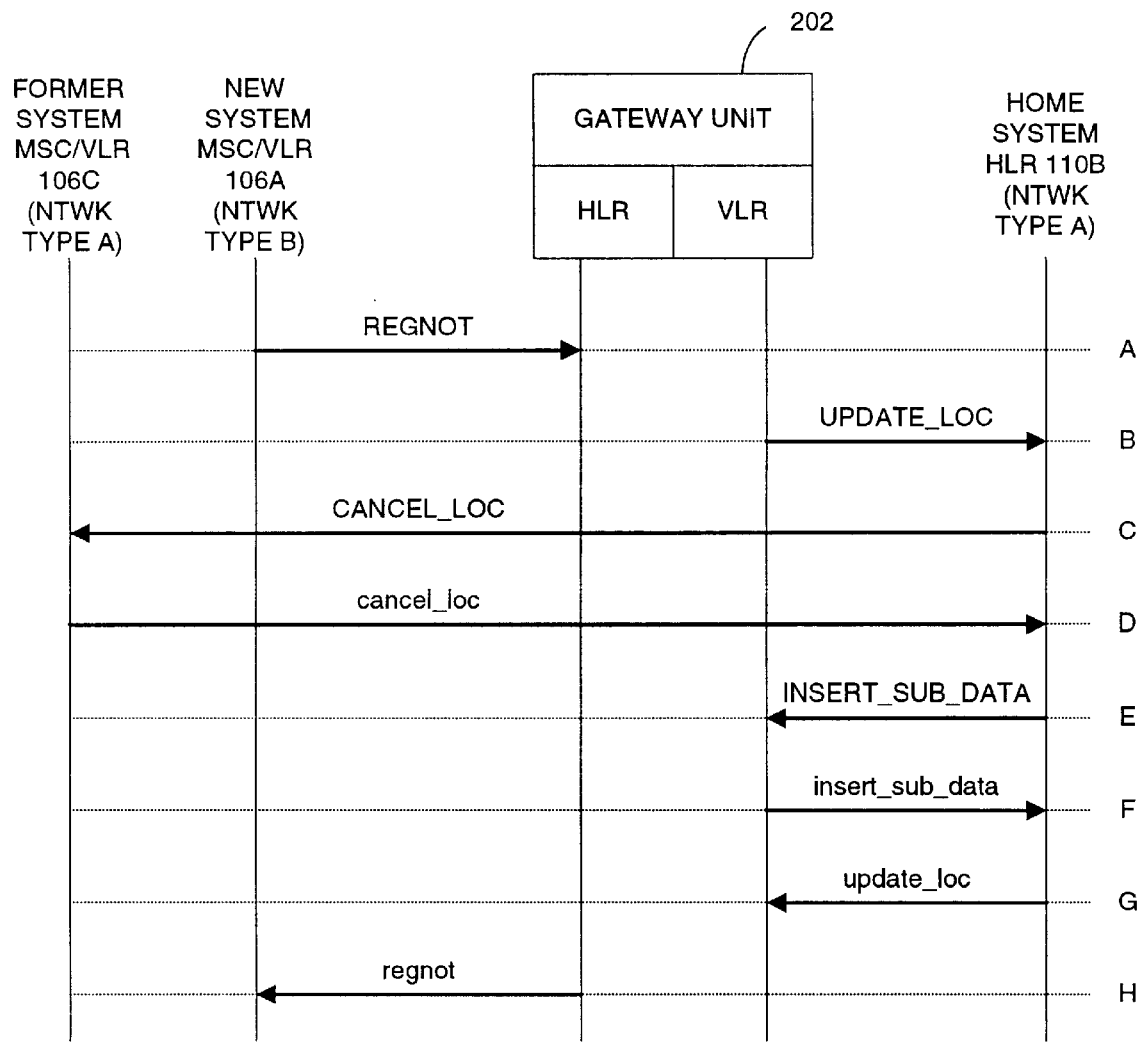
FIG. 5a is an example of the registration signaling process when a mobile system enters a new type of network according to the preferred embodiment of the present invention.

FIG. 5a is an example of the registration signaling process when a mobile station enters a new type of network according to the preferred embodiment of the present invention. When the MS 102 changes MSC/VLRs from the MSC/VLR 106C in the home system or another visited system that supports DCS1900, to the MSC/VLR 106A in the visited system, the MSC/VLR 106A generates a registration notification (REGNOT) command and transmits the REGNOT command to the gateway HLR unit 204 of the signaling gateway 202 at time A. The gateway HLR unit 204 receives 402 the signal and transmits the signal to the subscriber unit 312. The subscriber unit 312 determines 404 that the received signal from the visited system is not compatible with the home system and also determines that the HLR 110B of the home system should be updated 408. The subscriber unit 312 generates 410 an update location signal (UPDATE_LOC) and sends the signal to the DCS1900 VLR data unit 326. The DCS1900 VLR data unit transmits 412 the signal to the home system HLR 110B at time B. The UPDATE_LOC signal includes a return network address that is used by the HLR 110B of the home system when transmitting a signal to the new MSC/VLR 106A. The network address provided in the UPDATE_LOC signal is the network address of the DCS1900 VLR data unit 326 of the signaling gateway 202 instead of the network address of the new MSC/VLR 106A because the visited system and home system utilize different protocols.

Figure 1:
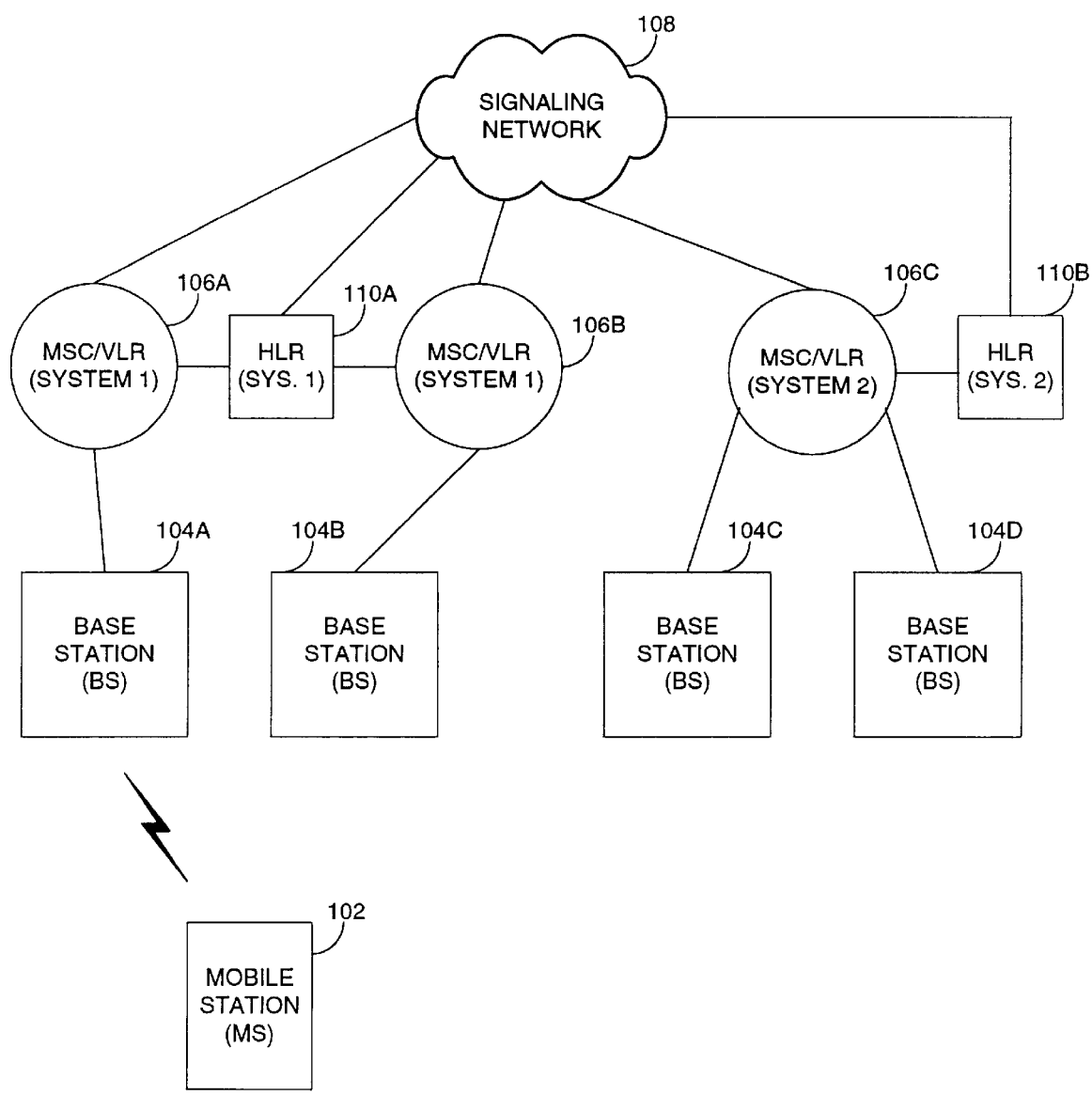
FIG. 1 is an illustration of an example of a cellular network topology including a signaling network coupled between first and second communication systems.

In response to the UPDATE_LOC signal, the home system HLR 110B generates a cancel location signal (CANCEL_LOC) and transmits this signal to the MSC/VLR 106C in the former system at time C. The network address to which the CANCEL_LOC signal is transmitted is the network address of the MSC/VLR 106C of the former system because the MSC/VLR 106C of the former system uses a protocol that is compatible with the home system (and in FIG. 1, is part of the home system). The MSC/VLR 106C generates and transmits a response signal "cancel_loc" to the HLR 110B of the home system at time D. At time E, the HLR 110B of the home system generates and transmits a data signal (INSERT_SUB_DATA) to the gateway VLR unit 208 of the signaling gateway 202. The HLR 110B of the home system considers the gateway VLR unit 208 the VLR at the destination MSC/VLR 106A. As described above, the gateway VLR unit 208 is a VLR to the HLR 110B of the home system. The INSERT_SUB_DATA signal includes calling features, e.g., call forwarding, that are currently authorized and active. The DCS1900 VLR data unit 326 receives 422 the INSERT_SUB_DATA signal, and transmits the data to the data unit 302. The subscriber unit 312 determines 424 that the signal is not compatible with the IS-41B protocol of the visited system. The subscriber unit 312 then determines 428 that no signal needs to be transmitted to the MSC/VLR 106A based upon the INSERT_SUB_DATA signal because all of the information in this signal is stored in the signaling gateway 202. The subscriber unit 312 determines 434 that the HLR 110B of the home system expects a response signal, based upon the DCS1900 protocol. The subscriber unit 312 generates 436 a response signal (insert_sub_data) and the DCS1900 HLR data unit 326 transmits 438 the signal to the HLR 110B of the home system at time F. At time G the HLR generates an "update_loc" response signal and transmits the signal to the signaling gateway 202. The DCS1900 VLR data unit 326 receives 422 the update_loc signal and sends the response signal to the subscriber unit. The subscriber unit 312 then generates a registration notification response signal (regnot) and sends the signal to the IS-41B HLR data unit 320 that transmits the signal to the MSC/VLR 106A of the new visited system. The MS 102 is thereafter registered with the MSC/VLR 106A in the visited system. A description of the registration process when the MS 102 roams from a BS 104A associated with MSC/VLR 106A to a BS 104B associated with another MSC/VLR 106B supporting the same signaling protocol as the protocol supported by the visited system, e.g., IS-41B, is described below with respect to FIG. 5b.

Figure 5B:
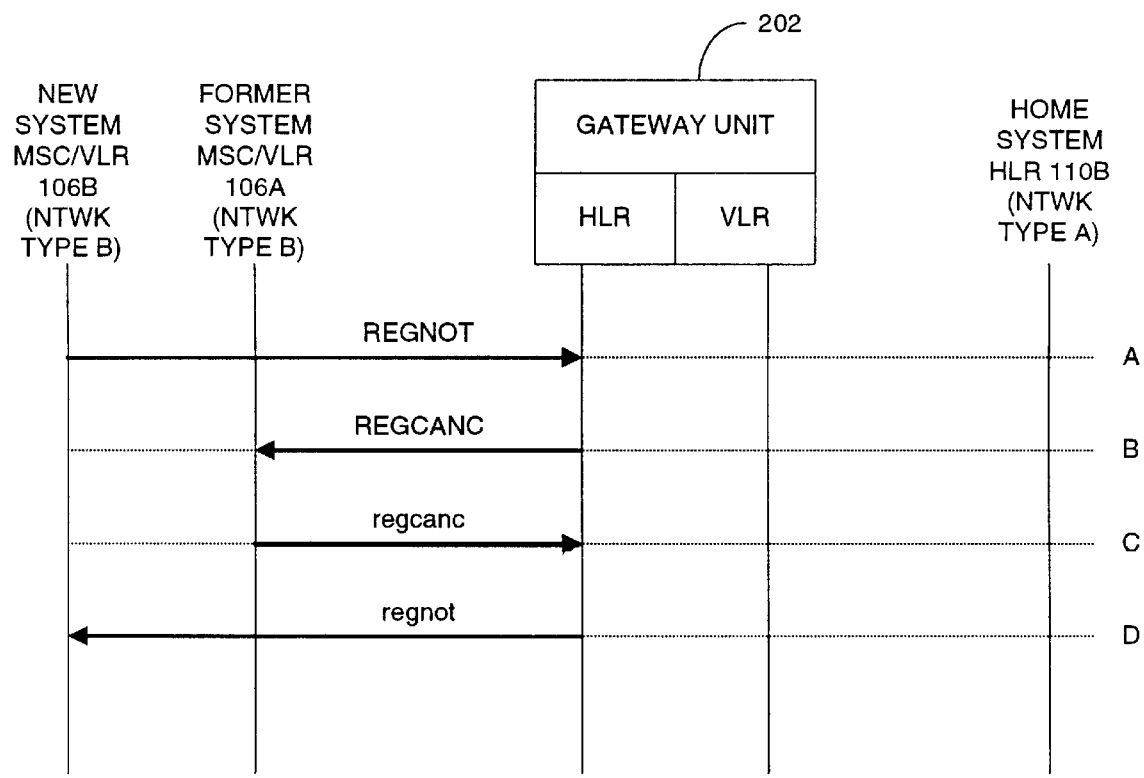
FIG. 5b is an example of the registration signaling process when a mobile system enters a new system having the same type of network as an old system according to the preferred embodiment of the present invention.

FIG. 5b is an example of the registration signaling process when a mobile station enters a new system having the same type of network as the previous serving system according to the preferred embodiment of the present invention. The new MSC/VLR 106B generates and transmits a registration notification signal (REGNOT) to the signaling gateway 202 at time A. The subscriber unit 312 determines 404 that the signal is not compatible with the home system. Since the MS 102 is connected to another MSC/VLR 106B supporting the same protocol, e.g., IS-41B, and this change can be accomplished without alerting the HLR 110B, the subscriber unit 312 determines 408 that no signal should be transmitted to the HLR 110B in the home network. However, the subscriber unit 312 determines that in response to REGNOT signal, the IS-41B protocol requires the generation 416 and transmission 418 of a registration cancellation (REGCANC) signal to the former MSC/VLR 106A at time B. The former MSC/VLR 106A generates a response signal (regcanc) at time C and the subscriber unit 312 sends an appropriate signal to the IS-41B HLR data unit 320 that causes it to generate and transmit a registration notification response signal (regnot) to the new MSC/VLR 106B at time D. After receiving the regnot signal the MS 102 is registered in the new system.

Another feature of the present invention is that if an MS 102 roams outside of the home system, e.g., if the MS 102 registers with an MSC/VLR that supports additional features, e.g., authentication, the present invention enables the MS to utilize these additional feature even when the protocol utilized by the HLR of the home system does not support such features. FIG. 6 is an illustration of an example of a cellular network including a signaling gateway according to the preferred embodiment of the present invention, where features supported by a visited system are not supported by a home system. An example of two signaling protocols that support different features is the IS-41B and IS-41C signaling protocols. The IS-41C signaling protocol supports mobile station authentication in addition to other features not supported by the IS-41B signaling protocol such as voice privacy, e.g., air interface channel encryption, subscriber PIN access and subscriber PIN intercept protection, and flexible alerting, e.g., calling one number results in calls to multiple locations. With respect to FIG. 6, an MS 102 having a home system HLR 610B communicates with BS 612A and MSC/VLR 602A in the visited system.

The visited system can include at least one additional BS 612B and MSC/VLR 602B. The MSC/VLRs 602 in the visited system each support the IS-41C signaling protocol while the HLR 610B of the home system only supports the IS-41B signaling protocol and not the IS-41B signaling protocol. The HLR 610B in the home system and the MSC/VLRs 602 in the visited systems communicate via a SS7 signaling network 108, described above. A signaling gateway 603 is coupled to the SS7 signaling network 108 as illustrated in FIG. 3 and FIG. 6 and as described above with respect to FIG. 3. The signaling gateway 603 includes a gateway unit 606, a gateway HLR unit 604, and a gateway VLR unit 608. The signaling gateway is described in greater detail below with reference to FIGS. 7–8.

Figure 7:
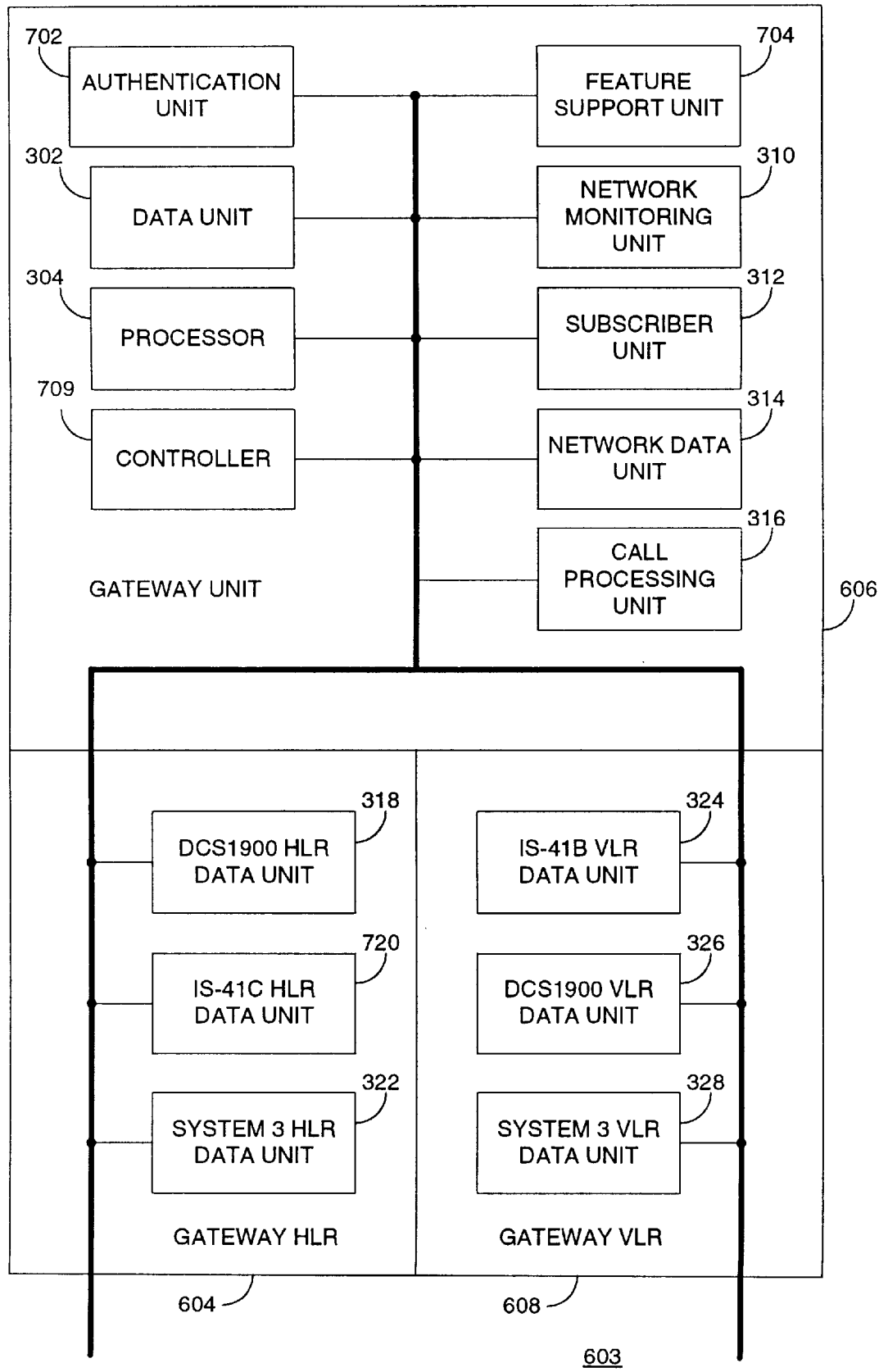
FIG. 7 is a more detailed illustration of the signaling gateway of the present invention which permits a first mobile station to utilize features supported by the visited system and not the home system.

FIG. 7 is a more detailed illustration of the signaling gateway of the present invention which permits a first mobile station to utilize features supported by the visited system and not the home system. The gateway unit 606 includes an authentication unit 702, a feature support unit 704, a data unit 302, a processor 304, a controller 709, a network monitoring unit 310, a subscriber unit 312, a network data unit 314, and a call processing unit 316. The controller 709 performs functions similar to the controller 309 described above including controlling the operation of the signaling gateway 603 having the authentication unit 702 and the feature support unit 704. Additional functions include identifying and controlling data bus access and communicating with the elements in the gateway unit 606 the gateway HLR unit 604, and the gateway VLR unit 608 to control of the timing and sequence of the procedures performed by signaling gateway 603. The gateway HLR unit 604 can include one or more of a DCS1900 HLR data unit 318, an IS-41C HLR data unit 720, and a System 3 HLR data unit 322, for example an IS-41B HLR data unit. The gateway VLR unit 608 can include one or more of an IS-41B VLR data unit 324, a DCS1900 VLR data unit 326, and a system 3 VLR data unit 328, for example, an IS-41C VLR data unit 328. The operation of the IS-41C HLR data unit 720 is similar to the operation of the IS-41B HLR data unit 320 described above with reference to FIG. 3. One difference is that the IS-41C HLR data unit 720 supports the additional features of the IS-41C signaling protocol described above, e.g., authentication. In one embodiment of the present invention, the authentication unit 702 and the feature support unit 704 are conventional storage modules, e.g., RAM, that when operated upon by the processor 304 operate in a non-conventional manner, e.g., the authentication unit 702 and the feature support unit 704 can be a computer readable medium having a computer program stored therein wherein the process performed by the computer program is as described below. The authentication unit 702 includes a mobile identification number (MIN), an electronic serial number (ESN) and an authentication key (A-key) that are unique to each MS 102. The authentication unit 702 can implement a conventional authentication procedure, for example, the authentication procedure in the IS-41C protocol that was incorporated by reference in its entirety above. The present invention operates using the technique described above with respect to FIG. 4a and FIG. 4b. In order for the MS 102 to utilize a feature in the IS-41C signaling protocol that is not available in the IS-41B protocol supported by the home system, the signaling gateway 603 authorizes the use of the functions based upon information received from the HLR 610B. Specifically, the authentication unit 702 performs the authentication functions normally performed by an HLR, and the feature support unit 704 performs additional functions normally performed by the HLR. With respect to FIG. 4a, the authentication unit 702 generates the authentication commands and responses during step 416, i.e., it generates a response signal. Similarly, the feature support unit 704 generates the additional feature commands and responses during step 416. Some examples of the operation of the authentication unit 702 are described below with reference to FIG. 8.

Figure 8:
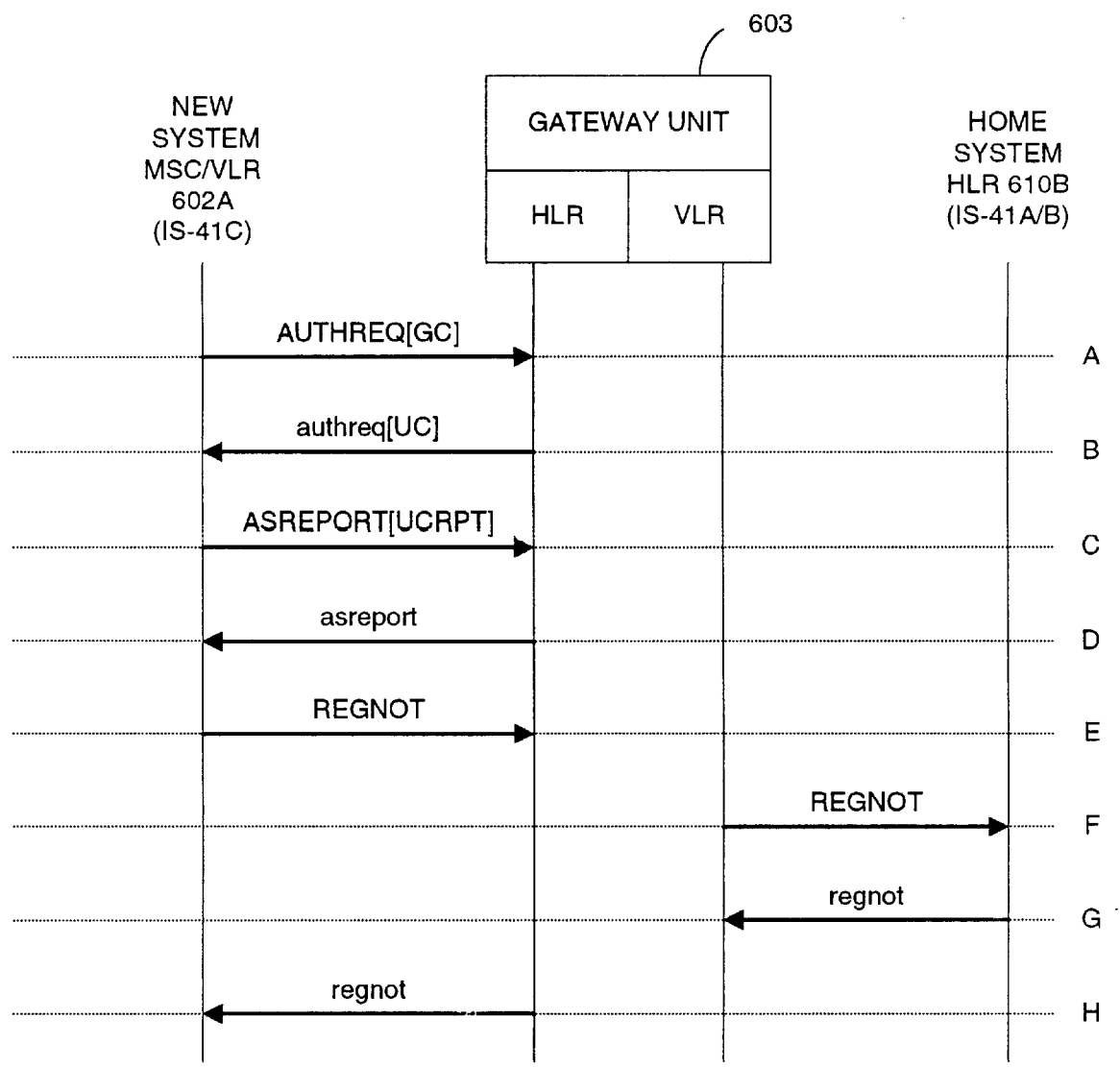
FIG. 8 is an example of a registration signaling process including authentication according to one embodiment of the present invention.

FIG. 8 is an example of a registration signaling process including authentication according to one embodiment of the present invention. In FIG. 8 an MSC/VLR 602A and the authentication unit 702 in the signaling gateway 603 perform an authentication procedure. At time A the MSC/VLR 602A in the IS-41C system transmits an authentication request (AUTHREQ) to the authentication unit 702. The authentication request includes an authentication value based upon a global authentication challenge (GC). The authentication unit 702 compares the GC value with a value determined based upon the MS information, e.g., the MIN, ESN, and the A-Key, and the authentication protocol stored in the authentication unit. If the GC matches the value determined by the authentication unit 702, the authentication unit can deem the MS authentic or it can challenge the MS to generate another authentication value. At time B the authentication unit 702 issues a response to the authentication signal (authreg[UC]) requesting that the MS generate another authentication value. This response signal includes a "unique challenge" having a random value and the expected response value based upon the effect of the authentication procedure on the random value. The random value is transmitted to the MS 102 which determines a new authentication value. The MSC/VLR 602A compares the new authentication value with the expected response value. If the values match, the MSC/VLR 602A transmits an authentication report command (ASREPORT[UCRPT]) to the authentication unit 702 at time C indicating whether the MS 102 has passed or failed the authentication procedure. The authentication unit 702 acknowledges the message at time D using the authentication report response (asreport). If the MS 102 is authenticated, the MSC/VLR 602A attempts to register the MS 102 at time E by transmitting a registration notification signal (REGNOT) to the signaling gateway 603. If the MS 102 satisfied the authentication process, the signaling gateway 603 transmits a registration notification command (REGNOT) to the HLR of the home system at time F. If the MS 102 does not satisfy the authentication process the authentication unit 702 prevents the MS 102 from registering using the technique set forth in a conventional authentication protocol. After receiving the registration notification command (REGNOT), the home system HLR 610B generates and transmits a registration notification response signal (regnot) to the signaling gateway 603. The signaling gateway 603 then generates and transmits a registration notification response signal (regnot) to the MSC/VLR 602A. This completes the authentication and registration process of an MS 102 transmitting through the MSC/VLR 106A. Accordingly, even though the home system HLR 610B for the MS 102 was not capable of authenticating the MS 102 using the IS-41C authentication procedure, the present invention enables the MS 102 to utilize this feature while visiting a system supporting authentication.

It will be apparent to persons skilled in the relevant art that alternate authentication procedures and new feature procedures can utilize the signaling gateway 603 of the present invention to increase the number of features available to an MS 102. In addition, the invention can be used for international communications and communication with local area network systems, for example.

As described above, one embodiment of the present invention is positioned between a system supporting the DCS1900 signaling protocol and a system supporting the IS-41 signaling protocol. A description of one technique for performing some of the functions of the signaling gateway 603 is set forth in Appendix A. It will be apparent to persons skilled in the relevant art that alternate protocol conversions can be used without departing from the scope of the present invention.

While the present invention has been particularly shown and described with reference to a preferred embodiment, and several alternate embodiments, it will be understood by persons skilled in the relevant art that various changes in form and details can be made therein without departing from the spirit and scope of the invention.

What is claimed is:

1. A system for communicating between a first communication system having a first signaling protocol and a second communication system having a second signaling protocol, the first signaling protocol not fully compatible with the second signaling protocol, the system comprising:
a signaling gateway module, disposed to receive signals from, and positioned outside of, the first and second communication systems, including:
a first unit, for receiving a first signal transmitted from the first communication system and directed toward said second communication system, and for generating a first request signal requesting first information in response to said first signal;
a gateway unit, coupled to said first unit, for receiving said first request signal, for determining if said gateway unit includes said first information and if said second communication system includes said first information, for generating a second request signal requesting said first information if said second communication system includes said first information, wherein said first signaling protocol supports a first feature, said second signaling protocol does not support said first feature, said gateway unit further comprising:
a feature unit, for permitting a mobile station having a home location register in the second communication system to utilize said first feature while communicating via the first communication system; and
a second unit, coupled to said gateway unit, for receiving said second request signal, for generating a second signal that is compatible with said second signaling protocol, said second signal including a request for said first information, and for transmitting said second signal to the second communication system.

2. The system of claim 1, wherein said first unit performs home location register functions for the first communication system.

3. The system of claim 1, wherein said second unit performs visited location register functions for the second communication system.

4. The system of claim 1, wherein said second unit receives a third signal from the second communication signal and generates a first response signal including said first information.

5. The system of claim 4, wherein said gateway unit receives said first response signal, and generates a second response signal having the first information if a fourth signal is to be transmitted to the first communication signal.

6. The system of claim 5, wherein said first unit receives said second response signal, generates said fourth signal compatible with the first signaling protocol and transmits said fourth signal to said first communication system.

7. The system of claim 1, wherein a first signaling network is disposed between the first and second communication systems, and is coupled to said signaling gateway module.

8. The system of claim 1, wherein said first communication system supports a first authentication feature, said second communication system does not support said first authentication feature, said gateway unit further comprising:
an authentication unit, for permitting a mobile station having a home location register in the second communication system to utilize said first authentication feature while communicating via the first communication system.

9. The system of claim 8, wherein said authentication unit includes:
an authentication data module, having mobile station information identified with said first mobile station;
an authentication analysis module, disposed to receive signals from said authentication data module, for determining an first authentication value based upon said mobile station information;
an authentication request module, disposed to receive signals from said first unit, for requesting a second authentication value from said mobile station; and
an authentication validity unit, disposed to receive signals from said authentication analysis module, for determining that said mobile is authentic if said first authentication value is equal to said second authentication value.

10. The system of claim 9, wherein said information identified with said first mobile station includes an electronic serial number and an A-key.

11. A system for communicating between a first communication system having a first signaling protocol and a second communication system having a second signaling protocol, the first signaling protocol not fully compatible with the second signaling protocol, the system comprising:
a signaling gateway means, disposed to receive signals from, and positioned outside of, the first and second communication systems, including:
first unit means, for receiving a first signal transmitted from the first communication system and directed toward said second communication system, and for generating a first request signal requesting first information in response to said first signal;
gateway means, coupled to said first unit means, for receiving said first request signal, for determining if said gateway means includes said first information and if said second communication system includes said first information, for generating a second request signal requesting said first information if said second communication system includes said first information, wherein said first signaling protocol supports a first feature, said second signaling protocol does not support said first feature, said gateway means further comprising:
a feature means, for permitting a mobile station having a home location register in the second communication system to utilize said first feature while communicating via the first communication system; and
second unit means, coupled to said gateway means, for receiving said second request signal, for generating a second signal that is compatible with said second signaling protocol, said second signal including a request for said first information, and for transmitting said second signal to the second communication system.

12. The system of claim 11, wherein said first unit means performs home location register functions for the first communication system.

13. The system of claim 11, wherein said second unit means performs visted location register functions for the second communication system.

14. The system of claim 11, wherein said second unit means receives a third signal from the second communication signal and generates a first response signal including said first information.

15. The system of claim 14, wherein said gateway means recevies said first response signal, and generates a second response signal having the first information if a fourth signal is to be transmitted to the first communication signal.

16. The system of claim 15, wherein said first unit means receives said second response signal, generates said fourth signal compatible with the first signaling protocol and transmits said fourth signal to said first communication system.

17. The system of claim 11, wherein a first signaling network is disposed between the first and second communication systems, and is coupled to said signaling gateway module.

18. The system of claim 11, wherein said first communication system supports a first authentication feature, said second communication system does not support said first authentication feature, said gateway means further comprising:

an authentication means, for permitting a mobile station having a home location register in the second communication system to utilize said first authentication feature while communicating via the first communication system.

19. The system of claim 18, wherein said authentication means includes:

an authentication data means, having mobile station information identified with said first mobile station;

an authentication analysis means, disposed to receive signals from said authentication data means, for determining an first authentication value based upon said mobile station information;

an authentication request means, disposed to receive signals from said first unit means, for requesting a second authentication value from said mobile station; and an authentication validity means, disposed to receive signals from said authentication analysis means, for determining that said mobile is authentic if said first authentication value is equal to said second authentication value.

20. The system of claim 19, wherein said information identified with said first mobile station includes an electronic serial number and an A-key.

21. A method for communicating between a first communication system having a first signaling protocol and a second communication systems having a second signaling protocol, the first signaling protocol not fully compatible with the second signaling protocol, the first signaling protocol supports a first communication feature, said second signaling protocol does not support the first communication feature, wherein a signaling gateway module is disposed to communicate with the first and second communication systems, the method comprising the steps of:

receiving a first signal at the signaling gateway from the first communication system, said first signal requesting first information from the second communication system, said first information relates to said first communication feature that is not supported by said second signaling protocol;

generating a first response signal in said signaling gateway module, said first response signal having said first information; and transmitting said first response signal to said first communication system.

22. The method of claim 21, wherein said first communication feature is an authentication feature.

* * * * *